United States Patent
Nathani et al.

(10) Patent No.: US 12,148,278 B2
(45) Date of Patent: Nov. 19, 2024

(54) TAMPER DETECTION DEVICE

(71) Applicants: SEPIO PRODUCTS PRIVATE LIMITED, Palghar Maharashtra (IN); INDIAN INSTITUTE OF TECHNOLOGY, KANPUR, Uttar Pradesh (IN)

(72) Inventors: Murad Nathani, Maharashtra (IN); Paul Abner Noronha, Maharashtra (IN); Darshan Dhruman Gandhi, Maharashtra (IN); Dattaprasad Narayan Kamat, Maharashtra (IN); Yashowanta Narayan Mohapatra, Kalyanpur (IN); Akhil Kumar Singh Rathore, Katrauli Patti (IN)

(73) Assignees: SEPIO PRODUCTS PRIVATE LIMITED, Palghar Maharashtra (IN); INDIAN INSTITUTE OF TECHNOLOGY, KANPUR, Uttar Pradesh (IN)

( * ) Notice: Subject to any disclaimer, the term of this patent is extended or adjusted under 35 U.S.C. 154(b) by 0 days.

(21) Appl. No.: 18/227,598

(22) Filed: Jul. 28, 2023

(65) Prior Publication Data
US 2023/0386311 A1 Nov. 30, 2023

Related U.S. Application Data

(63) Continuation-in-part of application No. 17/794,692, filed as application No. PCT/IB2021/050536 on Jan. 25, 2021, now Pat. No. 11,734,541.

(30) Foreign Application Priority Data

Jan. 23, 2020 (IN) ............................ 202021003050

(51) Int. Cl.
*G08B 13/24* (2006.01)
*G06K 19/07* (2006.01)
*H01Q 1/22* (2006.01)
*G08B 5/36* (2006.01)

(52) U.S. Cl.
CPC ..... *G08B 13/2431* (2013.01); *G06K 19/0715* (2013.01); *G06K 19/0724* (2013.01); *H01Q 1/2225* (2013.01); *G08B 5/36* (2013.01)

(58) Field of Classification Search
CPC .... G08B 13/2431; G08B 5/36; G08B 13/126; G06K 19/0715; G06K 19/0724; H01Q 1/2225
See application file for complete search history.

(56) References Cited

U.S. PATENT DOCUMENTS

| 7,015,814 B2 * | 3/2006 | Ireland ............... G08B 13/2448 340/572.1 |
| 9,030,321 B2 | 5/2015 | Breed |

(Continued)

FOREIGN PATENT DOCUMENTS

| EP | 3249634 B1 * | 5/2024 | ....... G06K 19/07372 |
| WO | WO-2005111961 A1 * | 11/2005 | ............. G06K 17/00 |

(Continued)

OTHER PUBLICATIONS

International Search Report and Written Opinion for Application No. PCT/IB2021/050536, dated Apr. 6, 2021.

*Primary Examiner* — Tuyen K Vo
(74) *Attorney, Agent, or Firm* — MARSHALL, GERSTEIN & BORUN LLP

(57) ABSTRACT

The present disclosure relates to the field of security systems and discloses a tamper detection device. The device (100) comprises at least one transducer (106,110), a power supply unit (114), a logical gate (112), a processing unit (104), and a tamper tag 102). The transducer (106,110) generates a (Continued)

trigger signal upon detection of a tamper event. The logical gate (112) is operable in an open state or a closed state. The processing unit (104) generates a tamper detection signal for changing the state of the logical gate (112) upon receiving the trigger signal or upon detecting loss of power supply from the power supply unit (114). The change in state of logical gate (112) is detected by a set of sensors (116), of the tamper tag (102), which in turn cause an LED indicator (118), of the tamper tag (102), to indicate the state of the device. An auxiliary capacitor (108) is configured to supply power to the processing unit (104) in the absence of the supply of power from the power supply unit (114).

17 Claims, 12 Drawing Sheets

(56) References Cited

U.S. PATENT DOCUMENTS

| | | | |
|---|---|---|---|
| 9,495,852 B1 * | 11/2016 | Colby | G06K 19/0723 |
| 2005/0231365 A1 | 10/2005 | Tester et al. | |
| 2011/0254665 A1 * | 10/2011 | Lindsay | G06K 19/07345 |
| | | | 340/10.5 |
| 2021/0110229 A1 * | 4/2021 | Colby | G06K 19/07749 |

FOREIGN PATENT DOCUMENTS

| | | | | |
|---|---|---|---|---|
| WO | WO-2006123983 A1 * | 11/2006 | | B65D 55/026 |
| WO | WO-2014018109 A1 * | 1/2014 | | G06K 19/0723 |

* cited by examiner

TAMPER DETECTION DEVICE

FIELD

The present disclosure relates generally to the field of security systems. More particularly, the present disclosure relates to a tamper detection device.

BACKGROUND

The background information herein below relates to the present disclosure but is not necessarily prior art.

Currently available passive and active Radio Frequency Identification (RFID) or Near Field Communication (NFC) based security seals/tags with tamper flags are not capable of detecting a tamper event in real time unless they are polled by an RFID/NFC reader. In the absence of RFID/NFC reader, a skilled counterfeiter can tamper with such a tag/seal and reassemble the same without leaving any electronic trace i.e. without changing the status of the tamper flag. Further, the conventional security systems are not capable of detecting unauthorized intrusions into the containers which are made without touching/damaging the seals, for example, by drilling holes through the containers. Such tampering events are not recorded by the tamper seal. Hence, under such a condition, when the tamper flag is read by an RFID reader, it will show a non-tampered status even though the seal/tag has been tampered with, which is not desired.

There is, therefore, felt a need for developing a tamper detection device that eliminates the above-mentioned drawbacks.

OBJECTS

Some of the objects of the present disclosure, which at least one embodiment herein satisfies, are as follows:

It is an object of the present disclosure to ameliorate one or more problems of the prior art or to at least provide a useful alternative;

An object of the present disclosure is to provide a tamper detection device.

Another object of the present disclosure is to provide a tamper detection device that can detect a tamper event and state of the device in real time.

Yet another object of the present disclosure is to provide a tamper detection device that can detect a tamper event even if the device is not damaged/broken during tampering.

Still another object of the present disclosure is to provide a tamper detection device that uses a combination of RFID+NFC communication technology to obviate the need for more expensive technology or elaborate solutions involving high power consumption communication technologies like Bluetooth/BLE, Wi-Fi.

Other objects and advantages of the present disclosure will be more apparent from the following description, which is not intended to limit the scope of the present disclosure.

SUMMARY

The present disclosure envisages a tamper detection device configured to be affixed to a product for detecting unauthorized intrusion of the container. The device comprises at least one transducer, a power supply unit, a logical gate, a processing unit, a tamper tag and an auxiliary capacitor.

The transducer is configured to detect at least one tamper event, and is further configured to generate at least one trigger signal upon detection of the tamper event. The transducer is selected from the group consisting of a pressure transducer, a flow meter sensor, a temperature sensor, a piezoelectric transducer, a photoelectric transducer, and a capacitive sensor. The logical gate is operable in states consisting of open state and closed state. In an embodiment, the logical gate is in the open state before use. The logical gate changes to the closed state when the device is fixed to the container and back to the open state when the device is tampered with.

The processing unit is configured in communication with the power supply unit. The processing unit is configured to receive power from the power supply unit. The processing unit is further configured to cooperate with the transducer and the logical gate to generate a tamper detection signal for changing the state of the logical gate upon the occurrence of an event selected from a group of events consisting of receiving the trigger signal from the transducer and detecting a cut-off of power supply from the power supply unit.

The tamper tag is connected to the logical gate. The tamper tag comprises a set of sensors connected to the logical gate. The sensors are configured to detect at least one critical parameter corresponding to a change in the state of the logical gate and generate a sensed signal. The tamper tag further comprises an LED indicator configured to communicate with the set of sensors. The LED indicator is configured to receive the sensed signal from the set of sensors, and is further configured to indicate the state of the device.

The auxiliary capacitor is configured to supply power to the processing unit in the absence of the supply of power from the power supply unit.

The LED indicator is configured to blink at different predetermined rates to indicate the state of the device selected from the group consisting of arming state, armed state, non-tampered state, and tampered state The tamper tag further includes an antenna for transmitting the state of the device to a reader, when the tag is scanned by the reader. The antenna is selected from the group consisting of a Radio Frequency Identification (RFID) antenna, a Near Field Communication (NFC) antenna, and an NFC+RFID antenna.

In an embodiment, the at least one transducer includes a pressure transducer and a photoelectric transducer. One pair of output terminals of the processing unit is connected to the pressure transducer and another pair of output terminals of the processing unit is connected to the photoelectric transducer. The pressure transducer can be selected from the group consisting of a force sensing resistor, a tactile switch, and a strain gauge. The photoelectric transducer can be selected from an LED (Light emitting diode), a light dependent resistor (LDR), a photo diode, and a photo transistor.

In an embodiment, the pressure transducer is fixed on a bridge between a frame and an edge of a door of the container to sense opening of the door and generate the corresponding trigger signal. The photoelectric transducer is fixed on an inner side of the door of the container to sense entry of light there into and generate the corresponding trigger signal. The processing unit generates the tamper detection signal when the pressure sensed by the pressure transducer exceeds a pre-defined threshold value, or when the entry of light into the container is sensed by the photoelectric transducer, or when the cut-off of power supply from the power supply unit is detected.

The critical parameters are selected from the group consisting of light, pressure or a combination thereof, and disconnection of battery.

In one embodiment, the power supply unit includes a rechargeable or a non-rechargeable battery. Alternatively, the power supply unit includes an energy harvesting unit selected from at least one of a piezoelectric transducer and a solar cell.

In an embodiment, the processing unit is programmed to generate the tamper detection signal for opening the logical gate after a pre-set delay, upon receiving the trigger signal from the transducer or detecting the cut-off of power supply from the power supply unit.

In an embodiment, the processing unit includes a real-time clock to keep track of a current date and time and a data logger configured to cooperate with the real-time clock to record a detected tampering event, date and time corresponding to the event, and additional information associated with the tampering event.

BRIEF DESCRIPTION OF ACCOMPANYING DRAWING

A tamper detection device of the present disclosure will now be described with the help of the accompanying drawing, in which.

LIST OF REFERENCE NUMERALS USED IN DETAILED DESCRIPTION AND DRAWING

100—Tamper detection device
102—Tamper Tag
104—Processing unit
106—First transducer
108—Auxiliary Capacitor
110—Second transducer
112—Logical Gate (BJT/MOSFET)
114—Battery (Power supply unit)
116—Sensor
118—LED indicator
120—Reader
202—Door frame
204—Edge of the door
206—Container door
208—Inner face of the container door

DETAILED DESCRIPTION

Embodiments, of the present disclosure, will now be described with reference to the accompanying drawing.

Embodiments are provided so as to thoroughly and fully convey the scope of the present disclosure to the person skilled in the art. Numerous details, are set forth, relating to specific components, and methods, to provide a complete understanding of embodiments of the present disclosure. It will be apparent to the person skilled in the art that the details provided in the embodiments should not be construed to limit the scope of the present disclosure. In some embodiments, well-known processes, well-known apparatus structures, and well-known techniques are not described in detail.

The terminology used, in the present disclosure, is only for the purpose of explaining a particular embodiment and such terminology shall not be considered to limit the scope of the present disclosure. As used in the present disclosure, the forms "a," "an," and "the" may be intended to include the plural forms as well, unless the context clearly suggests otherwise. The terms "comprises," "comprising," "including," and "having," are open ended transitional phrases and therefore specify the presence of stated features, integers, steps, operations, elements, modules, units and/or components, but do not forbid the presence or addition of one or more other features, integers, steps, operations, elements, components, and/or groups thereof.

When an element is referred to as being "mounted on," "engaged to," "connected to," or "coupled to" another element, it may be directly on, engaged, connected or coupled to the other element. As used herein, the term "and/or" includes any and all combinations of one or more of the associated listed elements.

Existing security seals/tags are not capable of detecting tamper events that are carried out without damaging/breaking the seals. Therefore, a security seal can be skillfully tampered with, without affecting the value of tamper flag within the seal, such that when the tamper flag is read by a reader, it will show a non-tampered status even though the seal/tag has been tampered with. To overcome this problem, a tamper status detecting device (hereinafter referred as "device 100") of the present disclosure is envisaged.

The tamper detection device 100 is affixed to a product for detecting an unauthorized intrusion of the product including containers, store rooms, storage containers, shipping containers, bottles, luggage, valuable commodities and the like. In case of rooms/containers, the device 100 may be affixed to one or more doors of the rooms/containers.

Figure 1:
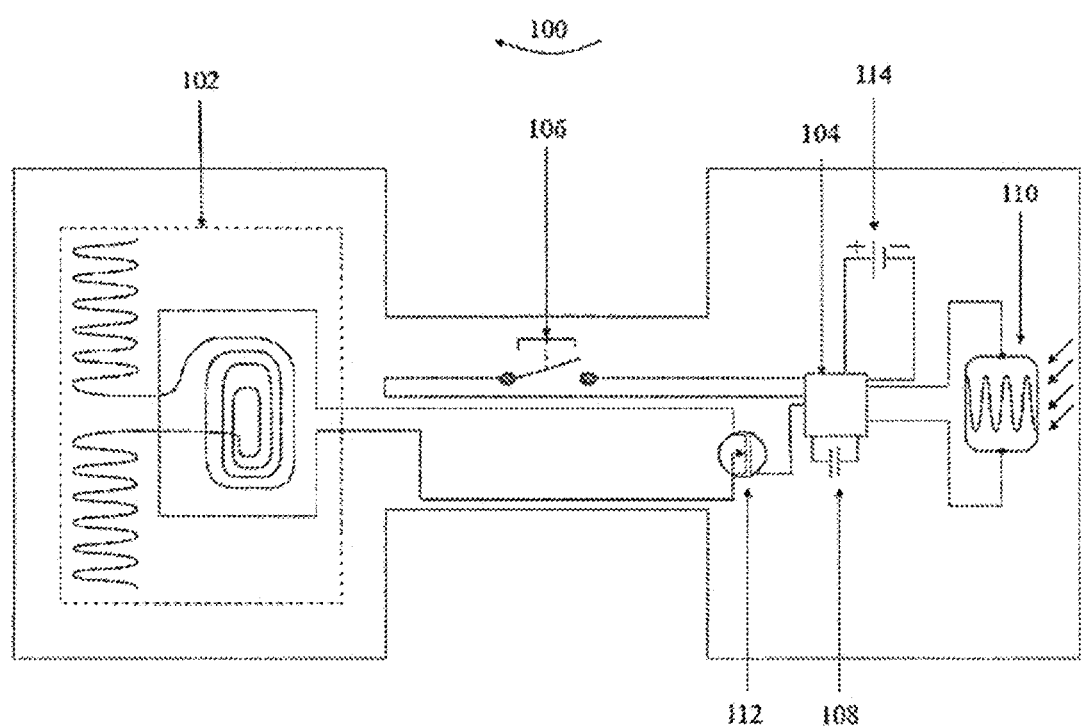
FIG. 1 and FIG. 2 illustrates a block diagram of a tamper detection device, in accordance with the present disclosure.
Figure 2:
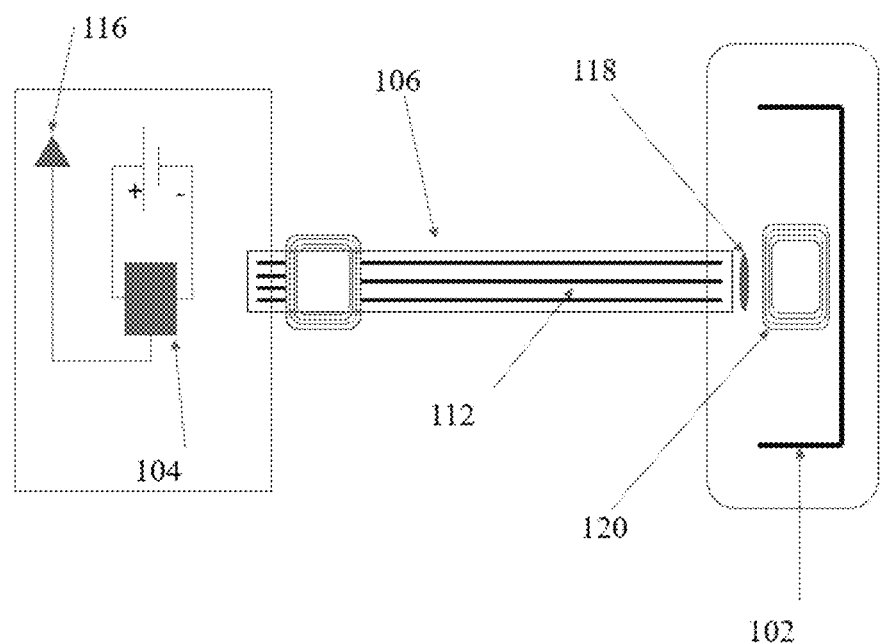

Referring to FIGS. 1 and 2, the tamper detection device 100 comprises a tamper tag 102, a processing unit 104, a logical gate 112, a power supply unit 114, at least one transducer (106 and 110), and an auxiliary capacitor 108.

The transducer 106, 110 is configured to detect at least one tamper event, and is further configured generate at least one trigger signal upon detection of the at least one tamper event.

The logical gate 112 is configured to be operable in states consisting of open state and closed state.

The processing unit 104 is configured in communication with the power supply unit 114 to receive power. The processing unit 104 is configured to receive power from the power supply unit 114. The processing unit 104 is further configured to cooperate with the transducer 106, 110 and the logical gate 112 to generate a tamper detection signal for changing the state of the logical gate 112 upon the occurrence of an event selected from a group of events consisting of:

(i) receiving the trigger signal from the transducer (106, 110); and
(ii) detecting a cut-off of power supply from the power supply unit 114.

The tamper tag 102 is connected to the logical gate 112. The tamper tag comprises a set of sensors 116 connected to the logical gate 112. The sensors 116 are configured to detect at least one critical parameter corresponding to a change in the state of the logical gate 112 and generate a sensed signal. The tamper tag 102 further comprises an LED indicator 118 configured to communicate with the set of sensors. The LED indicator 118 is configured to receive the sensed signal from the set of sensors 116, and is further configured to indicate the state of the device 100.

In an embodiment, the terminals/leads of the tamper tag 102 may be connected to the logical gate 112 that is driven by the processing unit 104. In an embodiment, the LED indicator is configured to blink at different predetermined rates to indicate the state of the device 100 selected from the group consisting of arming state, armed state, non-tampered state, and tampered state.

In an embodiment, the tag 102 further includes an antenna for transmitting the state of the device 100 to a reader when the tag 102 is scanned by the reader 120. The antenna may be selected from the group consisting of a Radio Frequency Identification (RFID) antenna, a Near Field Communication (NFC) antenna, and an NFC+RFID antenna. Accordingly, the tamper flag value can be read by an RFID/NFC reader 120.

In an exemplary embodiment, the device 100 includes two transducers 106, 110. One pair of output terminals/leads of the processing unit 104 may be connected to the first transducer 106 and another pair of output terminals/leads of the processing unit 104 may be connected to the second transducer 110. The first and second transducers 106, 110 may be configured to detect tamper events, and the processing unit 104 may be further configured to change the state of the logical gate, upon detection of the tamper events. The change in state of logical gate is sensed by the sensors which generates corresponding sensed signals. These signals are received by an LED indicator to indicate the state of the device 100.

The first and second transducers (106, 110) may be selected from the group consisting of a pressure transducer, a flow meter sensor, a temperature sensor, a piezoelectric transducer, a photoelectric transducer, a capacitive sensor and the like.

Figure 3:
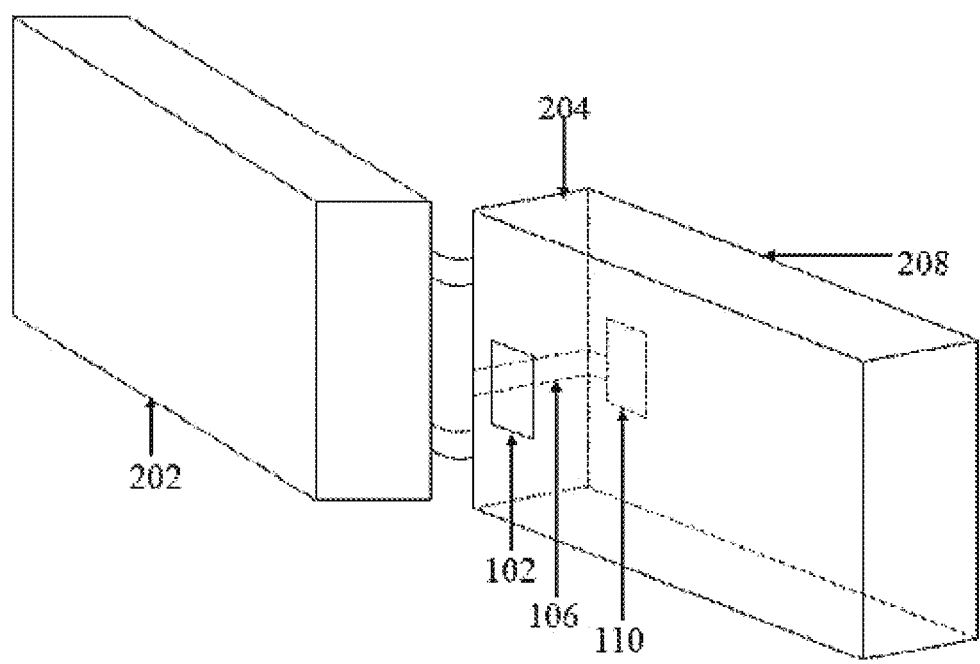
FIG. 3 illustrates a fixing arrangement of the tamper detection device of FIG. 1 on a container door, in accordance with the present disclosure; and FIG. 4 through FIG. 12 illustrates flow charts depicting indication of various states of the tamper detection device of FIG. 2.

In an embodiment of FIG. 3, the first transducer 106 is a pressure transducer and the second transducer 110 is a photoelectric transducer. The device 100 may be attached to a container door 206 such that the tamper tag 102 is stuck on the outside of the door 206. The first transducer 106 is placed on a bridge located between the door frame 202 and the edge 204 of the door 206. The second transducer 110 is housed within a flag stuck on the inner face 208 of the door 206 such that it is exposed to light only when the door 206 is opened.

The pressure transducer may be selected from the group consisting of, but not limited to force sensing resistor (FSR), tactile switch, strain gauge, and the like. The photoelectric transducer may be selected from the group consisting of, but not limited to LED (Light emitting diode), light dependent resistor (LDR), photo diode, photo transistor, and the like.

In an embodiment, the logical gate 112 is in an open state before use. When the container is loaded and the container door 206 is closed (i.e. locked) after fixing the device 100, the pressure transducer may experience a pressure. When the pressure experienced by the pressure transducer reaches a pre-defined threshold value, the processing unit 104 closes the logical gate 112. The threshold pressure value for triggering a closing event can be controlled by adding additional electronic components to regulate the output of the pressure transducer or by selecting the pressure transducer accordingly. The state of the device 100 is conveyed by the LED indicator by blinking.

Once the logical gate 112 is closed, the processing unit 104 may be programmed to open the logical gate 112 after a pre-set delay, only when any one of the following conditions are met:

i. when the pressure on the pressure transducer changes by a pre-determined value, wherein the pre-determined value can be controlled by adding additional electronic components to regulate the output of the pressure transducer or by selecting the transducer accordingly;

ii. when a pre-determined amount of light falls on the surface of the photoelectric transducer, wherein the pre-determined amount can be controlled by adding additional electronic components to regulate the output of the photoelectric transducer or by selecting the photoelectric transducer accordingly; and iii. when there is any attempt of removal of the power supply unit/battery from the tamper status detecting device 100.

Once the logical gate 112 is opened due to either of the above three conditions, the logical gate 112 cannot be closed again. Thus, when the user scans the tamper tag 102 using the reader, the status of the device 100 is shown as "tampered" or "unlocked".

The pre-set delay of the processing unit 104 ensures that any light falling on the photoelectric transducer before the door 206 is completely closed, does not trigger a false signal to open the logical gate. Once the door 206 is completely secured, the inside of the container should be completely dark.

In an exemplary embodiment, the pressure transducer is placed on the bridge between the frame 202 and the edge 204 of the door 206 and the photoelectric transducer 110 is fixed on the inner side of the door 206. When the door 206 is opened, the bridge of the pressure transducer 106 may be squeezed between the frame 202 and the edge 204 of the door 206. This exerts pressure on the pressure transducer 106. When the pressure experienced by the pressure transducer 106 changes by the pre-determined value, the pressure transducer 106 generates a trigger signal for opening the logical gate 112 to the processing unit 104. The state of the device 100 is conveyed by the LED indicator by blinking.

Any attempt to open the door 206 or access the container by drilling a hole through the side of the container will also trigger a tamper event due to light falling on the photoelectric transducer. Similarly, any attempt to open or dislodge the door 206 from the hinges will trigger a tamper event due to change in the pressure experienced by the pressure transducer.

In an embodiment, the auxiliary capacitor 108 can be used to store energy generated by the first and second transducers 106, 110 in order to power the processing unit 104 temporarily even after the tamper events have occurred. The auxiliary capacitor 108 can be further used to supply power to the processing unit 104 to facilitate generation of the tamper detection signal in absence of the supply power from the power supply unit 114. In another embodiment, the processing unit 104 can be powered by a battery independent of the transducers 106, 110.

In an embodiment, the tamper tag 102 includes at least one of NFC and RFID antenna to transmit the tamper flag value to the reader. Thus, the device 100 does not need expensive or high power consuming communication methods like Bluetooth/BLE, Wi-Fi and like that.

In another exemplary embodiment, the default condition of the logical gate 112 is open. A first user/an exporter may attach the device 100 to the container door 206. At this stage, the logical gate closes due to the pressure experienced by the pressure transducer. The closed state of the logical gate corresponds to a "not-tampered" or "locked" tamper status. The container may be transported to an end user in this condition. Thus, if the end user reads the tamper flag of the tag 102 using the reader, it will show a "not-tampered" or "locked" status. However, if the container is tampered with or opened during transport, without damaging or breaking the device 100, the tamper flag value will change, either due to (i) a change in pressure on the pressure transducer or (ii)

detection of light by the photoelectric transducer or (iii) any attempt to remove the power supply from the system to deactivate the device 100. This change in tamper flag value will be reflected as "tampered" or "unlocked" on the reader, when the tag 102 is scanned by the end user. The device 100 is thus able to detect a tamper event in real time. Once the tamper event is detected, it cannot be undone.

In one embodiment, if a counterfeiter tries to remove the battery from the system, in that way counterfeiter deactivates the tamper detection process, the device 100 records this event also as a tamper event. In this case, the auxiliary capacitor 108 provides power supply to the processing unit 104 till event is recorded.

In another embodiment, the processing unit (Microcontroller) 104 keeps tracks of all tamper event from the activation of the tamper tag 102. This is beneficial in the sense that it would allow approximately locating the place of the event. For that, the device 100 includes a real-time clock to keep track of a current date and time and a data logger configured to cooperate with the real-time clock to record a detected tampering event, date and time corresponding to the event, and additional information associated with the tampering event. The additional information may include location of the tamper event. All tampered event data as well as the current time can be recorded in the EEPROM of the central processing unit.

In one exemplary embodiment, the flexible connection between the two parts of the e-Seal may attract possible tampering of the connecting lines. To care of such possibilities, a modification has been incorporated so that any such attempt would indicate the tampered state correctly. In the modified circuit, the placement of detection transistor has been so placed that if the state of the seal is untampered, then attempts to short the lines would report tampered state, and if the state is already tampered then it would continue to remain so. The logic of the implementation has been detailed below. Hence the present disclosure is a significant modification making the seal even more robust.

Figure 4:
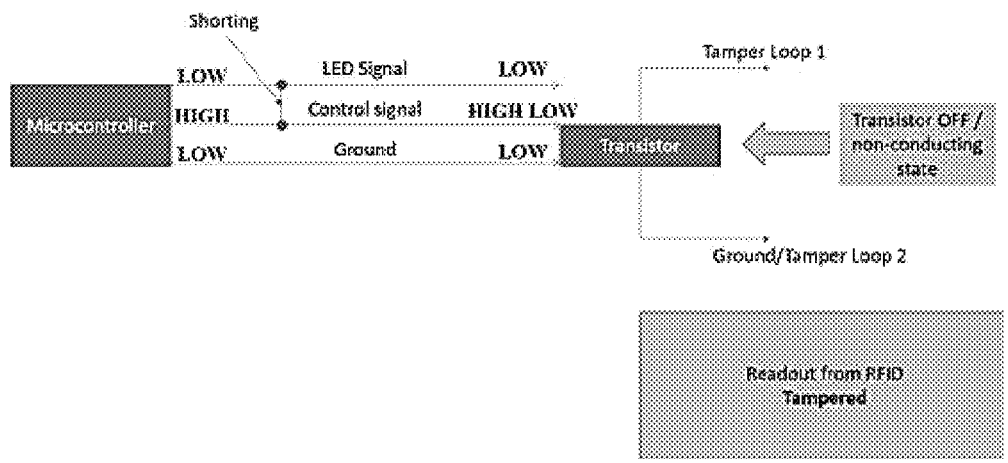

Case 1: Assuming Tag is in not Tampered State: Shorting of LED Signal with Control Signal As shown in FIG. 4, when the tag is in not tampered state, LED signal kept LOW. Therefore, there are two grounded wire and one control signal kept high for biasing of transistor. Shorting of LED signal with Control signal causes the control signal to become low, thereby changing the transistor biasing to cutoff which opens the tamper loop. The tamper tag will generate a tampered notification when read by the RFID reader, and will permanently set the status as tampered.

Figure 5:
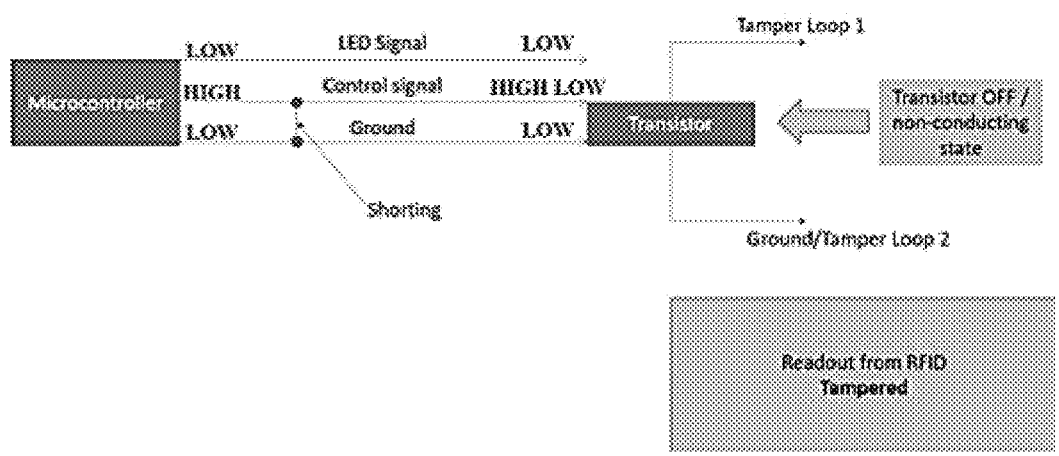

Case 2: Assuming Tag is in not Tampered State: Shorting of Control Signal with Ground As shown in FIG. 5, shorting of Control signal with Ground will cause control signal to become low, thereby changing the transistor biasing to cutoff which opens the tamper loop. The tamper tag will generate a tampered notification when read by the RFID reader, and will permanently set the status as tampered.

Figure 6:
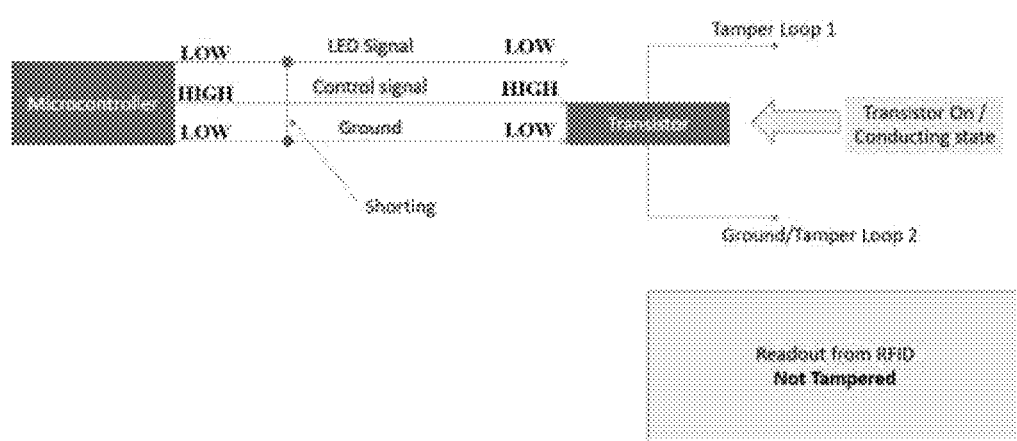

Case 3: Assuming Tag is in not Tampered State: Shorting of LED Signal with Ground As shown in FIG. 6, shorting of LED signal with Ground has no effect on control signal, which makes the transistor bias as conducting, and closes the tamper loop. The tamper tag will generate a not-tampered notification when read by the RFID reader. In case of an attempt of any unauthorized access of the container such as opening the doors/taking the door off the hinge or cutting through the container, the light and or the pressure sensor will detect the same and the microcontroller will change the control signal to low state. This will change the transistor biasing to cutoff, and open the tamper loop. The tamper tag will generate a tampered notification when read by the RFID reader, and will permanently set the status as tampered. Thus, the tag will function as expected.

Figure 7:
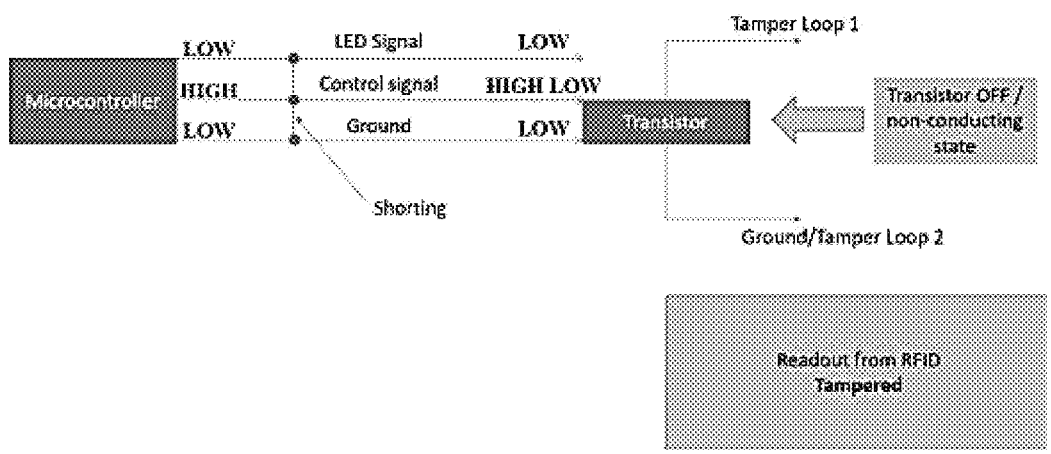

Case 4: Assuming Tag is in not Tampered State: Shorting of LED Signal and Control Signal with Ground As shown in FIG. 7, control signal becomes low which causes the transistor biasing to change to cutoff, and open the tamper loop. The tamper tag will generate a tampered notification when read by the RFID reader, and will permanently set the status as tampered.

Case 5: Assuming Tag is in Tampered State

Figure 8:
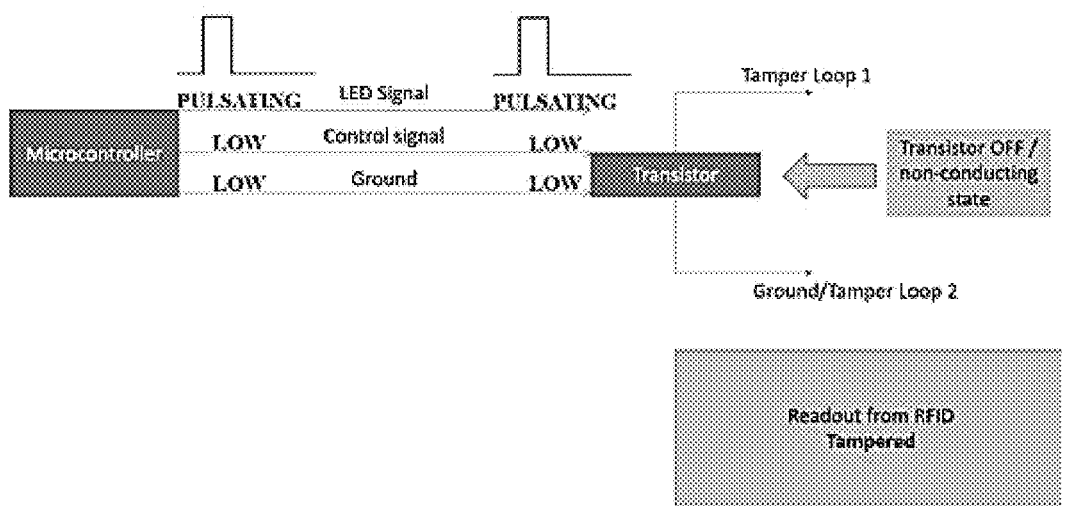

As shown in FIG. 8, LED signal is kept high for a very short duration in a minute say 0.5 Second, while rest of the time LED signal is kept LOW. If tamper has already been detected (by the microcontroller) then the control signal would change to LOW. The tamper tag will generate a tampered notification when read by the RFID reader, and will permanently set the status as tampered.

Figure 9:
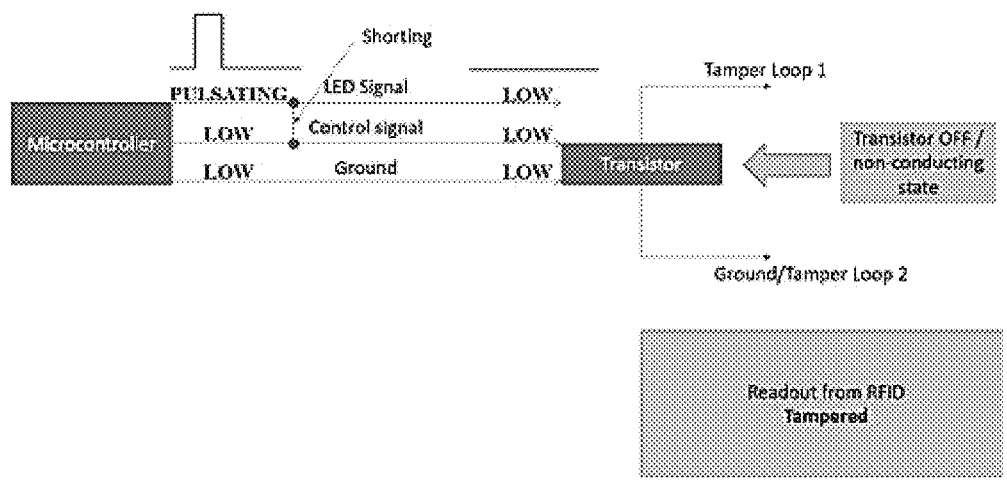

Case 6: Assuming Tag is in Tampered State: Shorting of LED Signal and Control Signal As shown in FIG. 9, Control signal is kept high for very small time say 0.5 second in a minute. This is a configurable setting and the LED can be switched off altogether in the tampered state. This may be done to ensure the tag will go into a tamper state permanently when read by the RFID reader). The transistor will be in conducting state for 0.5 seconds, and kept in open condition for almost 1 minute. If the tag is read while the transistor is in open condition, the tamper tag will generate a tampered notification when read by the RFID reader. The probability of the tag being read while the transistor is in conducting state (0.5 sec) is very low. This is a permanent change and any further notifications of the tag will always show tampered. The LED blinking may be affected.

Figure 10:
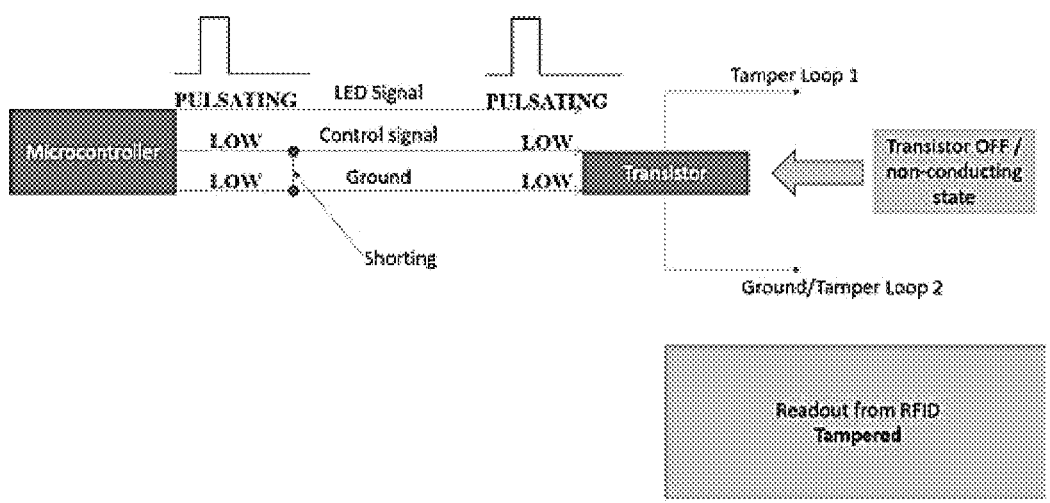

Case 7: Assuming Tag is in Tampered State: Shorting of Control Signal with Ground As shown in FIG. 10, the control signal is low therefore the transistor will be in cutoff condition, and will open tamper loop. The tamper tag will generate a tampered notification when read by the RFID reader, and will permanently set the status as tampered.

Case 8: Assuming Tag is in Tampered State: Shorting of LED Signal with Ground

Figure 11:
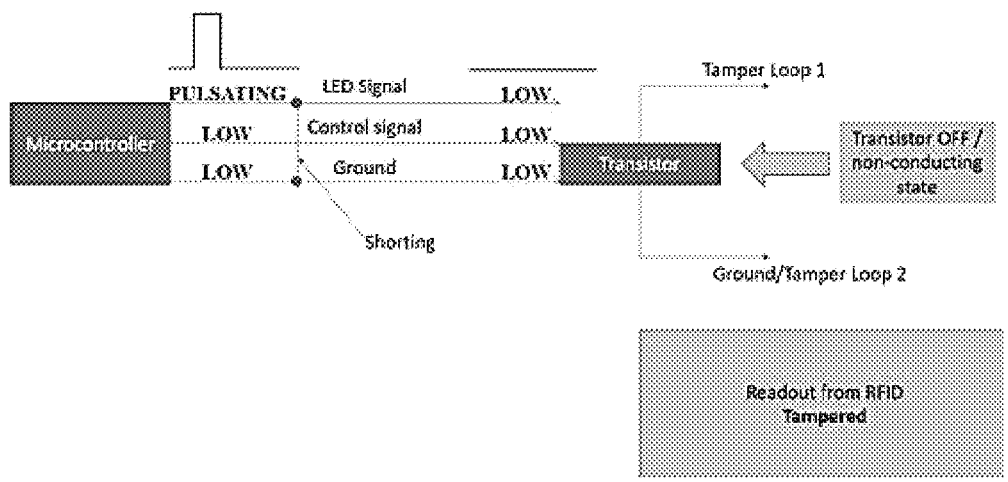

As shown in FIG. 11, control signal is low therefore the transistor will be in cutoff condition, and will open tamper loop. The tamper tag will generate a tampered notification when read by the RFID reader, and will permanently set the status as tampered. LED blinking may be affected.

Figure 12:
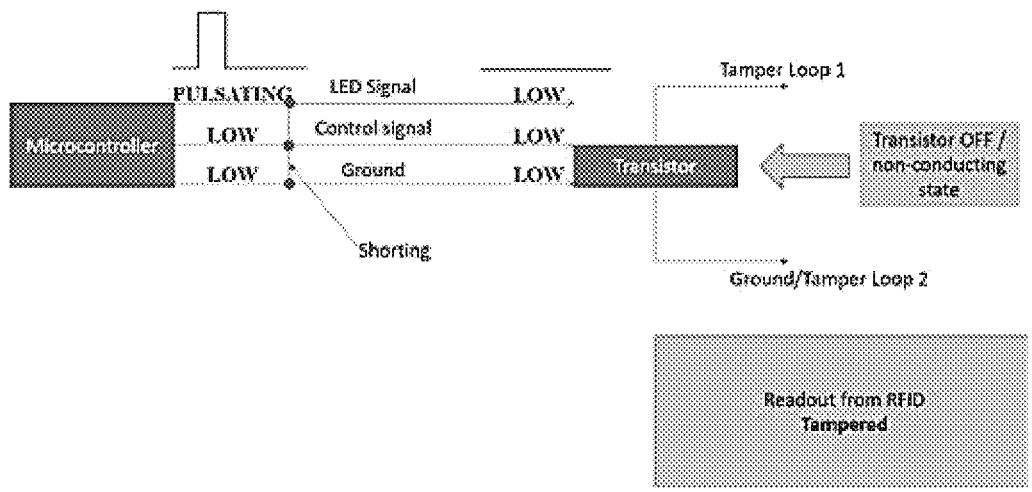

Case 9: Assuming Tag is in Tampered State: Shorting of LED Signal and Control Signal with Ground:

As shown in FIG. 12, control signal is kept high for very small time say 0.5 second in a minute (this is a configurable setting and the LED off altogether in the tampered state). The transistor will be in conducting state for 0.5 seconds, and in open condition for almost 1 minute. The tamper tag will generate a tampered notification when read by the RFID reader. This is a permanent change and any further readouts of the tag will always show tampered. The LED blinking may be affected.

In an embodiment the tamper tag 102 gives information about tampering when scanned with the NFC/UHF reader 120. But if the users are interested in knowing the cause of the tampered event, then there are three ways to do so, first one is destructive access to the processing unit 104, second one is communication using serial port from the processing unit 104, and third one is using i2c/spi supported NFC/UHF RFID IC. In the destructive access the processing unit 104 is removed from the device 100 and EEPROM data is read through a dedicated EEPROM reading device for microcontroller. The processing unit 104 also supports the serial communication, so the tampered data can be sent serially to the serial monitor. In a case where user is interesting in knowing tampered data over NFC only/UHF only, in such situation i2c/spi supported NFC/UHF IC can be used. The added benefit to the user is that the user doesn't require any other hardware except RFID reader.

In one embodiment, the power supply unit 114 includes a rechargeable or a non-rechargeable battery. In another embodiment, the power supply unit 114 includes an energy harvesting device like piezoelectric transducer, solar panel etc. In this case, power supply like coin cell battery will not be required in the device 100. To store harvested energy, the auxiliary capacitor 108 can be used. The auxiliary capacitor 108 may hold charge for the operation of the tamper status detecting device 100. The reader may be a user device such as a mobile phone, a laptop, a tablet, or a portable or wearable electronic device with scanning and processing capabilities. The user device may be associated with a user having a unique account ID. The account IDs may be pre-assigned to authorized users.

The processing unit 104 may be implemented using one or more microprocessors, microcomputers, micro-controllers, digital signal processors, central processing units, state machines, logic circuitries, and/or any devices that manipulate signals based on operational instructions.

Advantageously, the device 100 may be made using either flexible/printed electronics or hybrid electronics (printed with bonded components) or Printed Circuit Board (PCB). Alternatively, the device 100 may be a hybrid of flexible electronics and PCB to achieve both durability and strength.

TECHNICAL ADVANCES AND ECONOMICAL SIGNIFICANCE

The present disclosure described herein above has several technical advantages including, but not limited to, the realization of a tamper detection device that:

- can detect a tamper event and in real time;
- can indicate the state of the device in real time;
- can detect a tamper event even if the device is not damaged/broken during tampering; and
- uses a combination of RFID+NFC communication technology to obviate the need for more expensive technology or elaborate solutions involving high power consumption communication technologies like Bluetooth/BLE, Wi-Fi.

The foregoing description of the specific embodiments so fully reveals the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the disclosure to achieve one or more of the desired objects or results.

Any discussion of documents, acts, materials, devices, articles or the like that has been included in this specification is solely for the purpose of providing a context for the disclosure. It is not to be taken as an admission that any or all of these matters form a part of the prior art base or were common general knowledge in the field relevant to the disclosure as it existed anywhere before the priority date of this application.

While considerable emphasis has been placed herein on the components and component parts of the preferred embodiments, it will be appreciated that many embodiments can be made and that many changes can be made in the preferred embodiments without departing from the principles of the disclosure. These and other changes in the preferred embodiment as well as other embodiments of the disclosure will be apparent to those skilled in the art from the disclosure herein, whereby it is to be distinctly understood that the foregoing descriptive matter is to be interpreted merely as illustrative of the disclosure and not as a limitation.

The invention claimed is:

1. A tamper detection device (100) configured to be affixed to a product for detecting unauthorized intrusion of the product, said device (100) comprising:
   a. at least one transducer (106, 110) configured to detect at least one tamper event, and further configured to generate at least one trigger signal upon detection of the at least one tamper event;
   b. a power supply unit (114);
   c. a logical gate (112) operable in states consisting of open state and closed state;
   d. a processing unit (104) in communication with said power supply unit (114), said processing unit (104) configured to receive power from said power supply unit (114), said processing unit (104) further configured to cooperate with said transducer (106, 110) and said logical gate (112) to generate a tamper detection signal for changing the state of said logical gate (112) upon the occurrence of an event selected from a group of events consisting of:
      i. receiving said trigger signal from said transducer (106, 100), and
      ii. detecting a cut-off of power supply from said power supply unit (114);
   e. a tamper tag (102) connected to said logical gate (112), said tamper tag (102) comprising a set of sensors (116) connected to said logical gate (112), said sensors (116) configured to detect at least one critical parameter corresponding to a change in the state of said logical gate (112) and generate a sensed signal, said tamper tag (102) further comprising an LED indicator (118) configured to communicate with said set of sensors (116), said LED indicator (118) configured to receive said sensed signal from said set of sensors (116), and further configured to indicate the state of the device (100); and f. an auxiliary capacitor (108) configured to supply power to said processing unit (104) in the absence of the supply of power from said power supply unit (114).

2. The device (100) as claimed in claim 1, wherein said LED indicator (118) is configured to blink at different predetermined rates to indicate the state of the device (100) selected from the group consisting of arming state, armed state, non-tampered state, and tampered state.

3. The device (100) as claimed in claim 1, wherein said tag (102) includes an antenna for transmitting the state of the device (100) to a reader (120), when said tag (102) is scanned by the reader.

4. The device (100) as claimed in claim 3, wherein said antenna is selected from the group consisting of a Radio Frequency Identification (RFID) antenna, a Near Field Communication (NFC) antenna, and an NFC+RFID antenna.

5. The device (100) as claimed in claim 1, wherein said logical gate (112) is in the open state before use, wherein said logical gate (112) changes to the closed state when said device (100) is fixed to the container and back to the open state when said device (100) is tampered with.

6. The device (100) as claimed in claim 5, wherein said processing unit (104) is programmed to generate said tamper detection signal for opening said logical gate (112) after a pre-set delay, upon:
   a. receiving said trigger signal from said transducer (106, 100); or
   b. detecting the cut-off of power supply from said power supply unit (114).

7. The device (100) as claimed in claim 1, wherein said transducer (106, 110) is selected from the group consisting of a pressure transducer, a flow meter sensor, a temperature sensor, a piezoelectric transducer, a photoelectric transducer, and a capacitive sensor.

8. The device (100) as claimed in claim 1, wherein said at least one transducer (106, 110) includes a pressure transducer and a photoelectric transducer.

9. The device (100) as claimed in claim 8, wherein one pair of output terminals of said processing unit (104) is connected to said pressure transducer (106) and another pair of output terminals of said processing unit (104) is connected to said photoelectric transducer (110).

10. The device (100) as claimed in claim 8, wherein said pressure transducer (106) is selected from the group consisting of a force sensing resistor (FSR), a tactile switch, and a strain gauge.

11. The device (100) as claimed in claim 8, wherein said photoelectric transducer (110) is selected from an LED (Light emitting diode), a light dependent resistor (LDR), a photo diode, and a photo transistor.

12. The device (100) as claimed in claim 8, wherein,
   a. said pressure transducer (106) is fixed on a bridge between a frame (202) and an edge (204) of a door (206) of the container to sense opening of the door (206) and generate the corresponding trigger signal; and
   b. said photoelectric transducer (110) is fixed on an inner side of the door (206) of the container to sense entry of light thereinto and generate the corresponding trigger signal.

13. The device (100) as claimed in claim 12, wherein said processing unit (104) is configured to generate said tamper detection signal when:
   a. the pressure sensed by said pressure transducer (106) exceeds a pre-defined threshold value;
   b. the entry of light into the container is sensed by said photoelectric transducer (110); or
   c. the cut-off of power supply from said power supply unit (114) is detected.

14. The device (100) as claimed in claim 1, wherein said critical parameters sensed by said sensors (116) are selected from the group consisting of light, pressure or a combination thereof, and disconnection of battery.

15. The device (100) as claimed in claim 1, wherein said power supply unit (114) includes a rechargeable or a non-rechargeable battery.

16. The device (100) as claimed in claim 1, wherein said power supply unit (114) includes an energy harvesting unit, said energy harvesting unit including at least one of a piezoelectric transducer and a solar cell.

17. The device (100) as claimed in claim 1, wherein said processing unit (104) includes:
   a. a real-time clock to keep track of a current date and time; and
   b. a data logger configured to cooperate with said real-time clock to record a detected change in state event, date and time corresponding to said event, and additional information associated with the event.

* * * * *